T867,004

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 747

805,989

POLYOLEFIN STRAPPING

Pauk K. Fain, Jr., and John F. Isenberg, both of P.O. Box 511, Kingsport, Tenn. 37662

Continuation of application Ser. No. 669,718, Sept. 22, 1967. This application Feb. 26, 1969. Published Oct. 21, 1969

Int. Cl. C08f *45/00*

U.S. Cl. 260—32.6

No Drawing. 13 Pages Specification

An improved strapping material for binding bundles, boxes, packages and the like with a tensioned loop comprising a polyolefin and a slip agent selected from the group consisting of unsaturated fatty amides, saturated fatty amides, alcohol fatty amides, silicones, ethoxylated amines, phosphates and waxes. The amount of slip agent is between about .01% and 2.0% by weight of the polyolefin, and is evenly dispersed in the polyolefin.